United States Patent
Col et al.

(10) Patent No.: US 8,074,060 B2
(45) Date of Patent: Dec. 6, 2011

(54) OUT-OF-ORDER EXECUTION MICROPROCESSOR THAT SELECTIVELY INITIATES INSTRUCTION RETIREMENT EARLY

(75) Inventors: Gerard M. Col, Austin, TX (US); Brent Bean, Austin, TX (US); Bryan Wayne Pogor, Pflugerville, TX (US)

(73) Assignee: VIA Technologies, Inc., New Taipei (TW)

( * ) Notice: Subject to any disclaimer, the term of this patent is extended or adjusted under 35 U.S.C. 154(b) by 409 days.

(21) Appl. No.: 12/277,409

(22) Filed: Nov. 25, 2008

(65) Prior Publication Data

US 2010/0131742 A1 May 27, 2010

(51) Int. Cl.
*G06F 9/22* (2006.01)
*G06F 9/30* (2006.01)

(52) U.S. Cl. .......................................... 712/244; 712/23

(58) Field of Classification Search ..................... 712/23, 712/244

See application file for complete search history.

(56) References Cited

U.S. PATENT DOCUMENTS

| | | | |
|---|---|---|---|
| 5,226,126 A * | 7/1993 | McFarland et al. | 712/218 |
| 5,442,757 A * | 8/1995 | McFarland et al. | 712/218 |
| 5,923,872 A * | 7/1999 | Chrysos et al. | 712/244 |
| 7,133,969 B2 * | 11/2006 | Alsup et al. | 711/125 |
| 2004/0054876 A1 * | 3/2004 | Grisenthwaite et al. | 712/218 |
| 2004/0172521 A1 * | 9/2004 | Hooker et al. | 712/225 |
| 2005/0076180 A1 * | 4/2005 | Alsup et al. | 711/125 |

* cited by examiner

*Primary Examiner* — Aimee Li
(74) *Attorney, Agent, or Firm* — E. Alan Davis; James W. Huffman

(57) ABSTRACT

A microprocessor for improving out-of-order superscalar execution unit utilization with a relatively small in-order instruction retirement buffer. A plurality of execution units each calculate an instruction result. The instruction is either an excepting type instruction or a non-excepting type instruction. The excepting type instruction is capable of causing the microprocessor to take an exception after being issued to the execution unit, wherein the non-excepting type instruction is incapable of causing the microprocessor to take an exception after being issued. A retire unit makes a determination that an instruction is the oldest instruction in the microprocessor and that the instruction is ready to update the architectural state of the microprocessor with its result. The retire unit makes the determination before the execution unit outputs the result of the non-excepting type instruction, wherein the retire unit makes the determination after the execution unit outputs the result of the excepting type instruction.

21 Claims, 5 Drawing Sheets

*Fig. 3a (normal flow)*

| clock | 0 | 1 | 2 | 3 | 4 | 5 | 6 | 7 | 8 |
|---|---|---|---|---|---|---|---|---|---|
| | \multicolumn{6}{|c|}{issue and execute stages} | | retirement stages | | |
| | dispatch stage (D) 304 | queue stage (Q) 306 | register file stage (R) 308 | issue stage (I) 312 | execute stage (E) 314 | writeback stage (W) 316 | update ROB stage (A) 318 | find oldest entry stage (B) 322 | retire stage (C) 324 |
| | select oldest ready instruction from each RS and dispatch it | get instruction data (e.g., constants and operand identifiers) | get instruction source operands from register files | issue instructions and operands to execution units | execute instructions | write results from EUs to speculative registers  generate normal completions/ exceptions | update instruction status in ROB entry based on normal completions/ exceptions | organize and collate oldest instructions | write results from speculative registers to architectural registers  free ROB entries |

*Fig. 3b (early flow)*

| clock | 0 | 1 | 2 | 3 | 4 | 5 |
|---|---|---|---|---|---|---|
| | \multicolumn{6}{|c|}{issue and execute stages} |
| | dispatch stage (D) 304 | queue stage (Q) 306 | register file stage (R) 308 | issue stage (I) 312 | execute stage (E) 314 | writeback stage (W) 316 |
| | select oldest ready instruction from each RS and dispatch it | get instruction data (e.g., constants and operand identifiers) | get instruction source operands from register files  generate early completions/ exceptions | issue instructions and operands to execution units | execute instructions | write results from EUs to speculative registers |
| | | | | \multicolumn{3}{|c|}{retirement stages} |
| | | | | update ROB stage (A) 318 | find oldest entry stage (B) 322 | retire stage (C) 324 |
| | | | | update instruction status in ROB entry based on early completions/ exceptions | organize and collate oldest instructions | write results from EUs to architectural registers  free ROB entries |

Fig. 4a

| microinstruction | microinstruction type | issued to | execution cycles |
|---|---|---|---|
| m1 | non-early retire 124 | execution unit 1 | 1 |
| m2 | non-early retire 124 | execution unit 2 | 3 |
| m3 | non-early retire 124 | execution unit 1 | 2 |

Fig. 4b

| | clock cycle number | | | | | | | | | | |
|---|---|---|---|---|---|---|---|---|---|---|---|
| | 1 | 2 | 3 | 4 | 5 | 6 | 7 | 8 | 9 | 10 | 11 |
| D 304 | m1,m2 | m3 | | | | | | | | | |
| Q 306 | | m1,m2 | m3 | | | | | | | | |
| R 308 | | | m1,m2 | m3 | | | | | | | |
| I 312 | | | | m1,m2 | m3 | | | | | | |
| E (EU #1) 314 | | | | | | m1 | m3 | m3 | | | |
| E (EU #2) 314 | | | | | | m2 | m2 | m2 | | | |
| W 316 | | | | | | | m1# | m2#, m3# | | | |
| A 318 | | | | | | | | m1 | m2,m3 | | |
| B 322 | | | | | | | | | m1 | m2,m3 | |
| C 324 | | | | | | | | | | m1 retires | m2,m3 retires |

# = execution units generate normal tag, normal completion signal, and normal exception status

Fig. 5a

| microinstruction | microinstruction type | issued to | execution cycles |
|---|---|---|---|
| m1 | early retire 122 | execution unit 1 | 1 |
| m2 | early retire 122 | execution unit 2 | 3 |
| m3 | early retire 122 | execution unit 1 | 2 |
| m4 | early retire 122 | execution unit 2 | 1 |
| m5 | early retire 122 | execution unit 1 | 1 |
| m6 | early retire 122 | execution unit 2 | 1 |
| m7 | early retire 122 | execution unit 1 | 1 |
| m8 | early retire 122 | execution unit 2 | 1 |
| m9 | early retire 122 | execution unit 1 | 1 |

Fig. 5b

| | clock cycle number | | | | | | | | | | |
|---|---|---|---|---|---|---|---|---|---|---|---|
| | 1 | 2 | 3 | 4 | 5 | 6 | 7 | 8 | 9 | 10 | 11 |
| D 304 | m1,m2 | m3 | | m4,m5 | m6,m7 | m8,m9 | | | | | |
| Q 306 | | m1,m2 | m3 | | m4,m5 | m6,m7 | m8,m9 | | | | |
| R 308 | | | m1*,m2 | m3 | | m4*,m5* | m6*,m7* | m8*,m9* | | | |
| I 312 | | | | m1,m2 | m3* | | m4,m5 | m6,m7 | m8,m9 | | |
| E (EU #1) 314 | | | | | m1 | m3 | m3 | m5 | m7 | m9 | |
| E (EU #2) 314 | | | | | m2* | m2 | m2 | m4 | m6 | m8 | |
| W 316 | | | | | | m1 | | m2,m3 | m4,m5 | m6,m7 | m8,m9 |
| A 318 | | | | m1 | | m2,m3 | m4,m5 | m6,m7 | m8,m9 | | |
| B 322 | | | | | | m1 | | m2,m3 | m4,m5 | m6,m7 | m8,m9 |
| C 324 | | | | | | m1 retires | | m2,m3 retires | m4,m5 retires | m6,m7 retires | m8,m9 retires |

\* = issue logic generates early completion signal

OUT-OF-ORDER EXECUTION MICROPROCESSOR THAT SELECTIVELY INITIATES INSTRUCTION RETIREMENT EARLY

FIELD OF THE INVENTION

The present invention relates in general to the field of out-of-order execution microprocessors, and particularly to the retirement of instructions therein.

BACKGROUND OF THE INVENTION

Superscalar microprocessors have a plurality of execution units that execute the microinstruction set of the microprocessor. Superscalar microprocessors attempt to improve performance by including multiple execution units so they can execute multiple instructions per clock in parallel. A key to realizing the potential performance gain is to keep the execution units supplied with instructions to execute; otherwise, superscalar performance is no better than scalar, yet it incurs a much greater hardware cost. The execution units load and store microinstruction operands, calculate addresses, perform logical and arithmetic operations, and resolve branch instructions, for example. The larger the number and type of execution units, the farther back into the program instruction stream the processor must be able to look to find an instruction for each execution unit to execute each clock cycle. This is commonly referred to as the lookahead capability of the processor.

In a superscalar microprocessor with out-of-order execution, although instructions can execute out-of-order, they must retire in program order. Microprocessors that perform out-of-order execution require a buffer to retire microinstructions in program order, following execution. In some microprocessors, the buffer is called a reorder buffer, or ROB. The ROB has a fixed number of entries, and provides temporary storage for microinstructions and status information associated with each microinstruction. Retiring a microinstruction that is in the ROB includes storing the result of the microinstruction to architectural registers of the microprocessor and freeing (i.e., invalidating) the ROB entry occupied by the microinstruction so that a new microinstruction may be allocated an entry in the ROB.

The size, i.e., number of entries, of the ROB limits the lookahead capability of the processor. In particular, the size of the ROB limits the number of instructions that can be ready to be issued for execution, since an instruction must have a ROB entry allocated to it before it can be ready to issue. When all entries of the ROB are full, the oldest instruction must retire, i.e., update architectural state with its result, so that the ROB entry for the oldest instruction can be freed for re-allocation to a new instruction. One approach to increasing the lookahead capability of a microprocessor is to increase the number of entries in the ROB. However, each ROB entry takes a relatively large amount of space and power in the microprocessor to store its information, e.g., the instruction itself, temporary space for storing its result, and other information about the instruction. Therefore, making the size of a ROB large is a relatively costly way to increase the lookahead capability of a microprocessor.

Therefore, what is needed is a way to use the ROB in as efficient a manner as possible to improve performance through good execution unit utilization, while keeping the size of the ROB as small as possible.

BRIEF SUMMARY OF INVENTION

In one aspect the present invention provides a microprocessor for improving out-of-order superscalar execution unit utilization with a relatively small in-order instruction retirement buffer by selectively initiating instruction retirement early. The microprocessor includes a plurality of execution units each configured to calculate the result of an instruction. The instruction is either an excepting type instruction or a non-excepting type instruction. The excepting type instruction is capable of causing the microprocessor to take an exception after being issued to the execution unit to calculate its result, wherein the non-excepting type instruction is incapable of causing the microprocessor to take an exception after being issued to the execution unit to calculate its result. The microprocessor also includes a retire unit, coupled to the plurality of execution units, configured to make a determination that an instruction is the oldest instruction in the microprocessor and that the instruction is ready to update the architectural state of the microprocessor with its result. The retire unit is configured to make the determination before the execution unit outputs the result of the non-excepting type instruction, wherein the retire unit is configured to make the determination after the execution unit outputs the result of the excepting type instruction.

In another aspect, the present invention provides a method for improving out-of-order superscalar execution unit utilization in a microprocessor with a relatively small in-order instruction retirement buffer by selectively initiating instruction retirement early. The method includes calculating the result of an instruction, wherein the instruction is either an excepting type instruction or a non-excepting type instruction. The excepting type instruction is capable of causing the microprocessor to take an exception after being issued to an execution unit to calculate its result, wherein the non-excepting type instruction is incapable of causing the microprocessor to take an exception after being issued to the execution unit to calculate its result. The method also includes making a determination that an instruction is the oldest instruction in the microprocessor and that the instruction is ready to update the architectural state of the microprocessor with its result. Making the determination comprises making the determination before the execution unit outputs the result of the non-excepting type instruction. Making the determination comprises making the determination after the execution unit outputs the result of the excepting type instruction.

In yet another aspect, the present invention provides a computer program product for use with a computing device, the computer program product comprising a computer usable storage medium, having computer readable program code embodied in said medium, for specifying a microprocessor for improving out-of-order superscalar execution unit utilization with a relatively small in-order instruction retirement buffer by selectively initiating instruction retirement early. The computer readable program code includes first program code for specifying a plurality of execution units each configured to calculate the result of an instruction. The instruction is either an excepting type instruction or a non-excepting type instruction. The excepting type instruction is capable of causing the microprocessor to take an exception after being issued to the execution unit to calculate its result, wherein the non-excepting type instruction is incapable of causing the microprocessor to take an exception after being issued to the execution unit to calculate its result. The computer readable program code also includes second program code for specifying a retire unit, coupled to the plurality of execution units, configured to make a determination that an instruction is the oldest instruction in the microprocessor and that the instruction is ready to update the architectural state of the microprocessor with its result. The retire unit is configured to make the determination before the execution unit outputs the result of the non-excepting type instruction, wherein the retire unit is configured to make the determination after the execution unit outputs the result of the excepting type instruction.

BRIEF DESCRIPTION OF THE DRAWINGS

FIG. 3a is a block diagram illustrating issue and execute stages and retirement stages for non-early retire microinstructions according to the present invention.

FIG. 3b is a block diagram illustrating issue and execute stages and retirement stages for early retire microinstructions according to the present invention.

FIG. 4a is a table illustrating a sequence of three non-early retire microinstructions according to the present invention.

FIG. 4b is a timing diagram illustrating progression of the sequence of non-early retire microinstructions of FIG. 4a through the stages of FIG. 3a according to the present invention.

FIG. 5a is a table illustrating a sequence of nine early retire microinstructions according to the present invention.

FIG. 5b is a timing diagram illustrating progression of the sequence of early retire microinstructions of FIG. 5a through the stages of FIG. 3b according to the present invention.

DETAILED DESCRIPTION OF THE INVENTION

Figure 1:
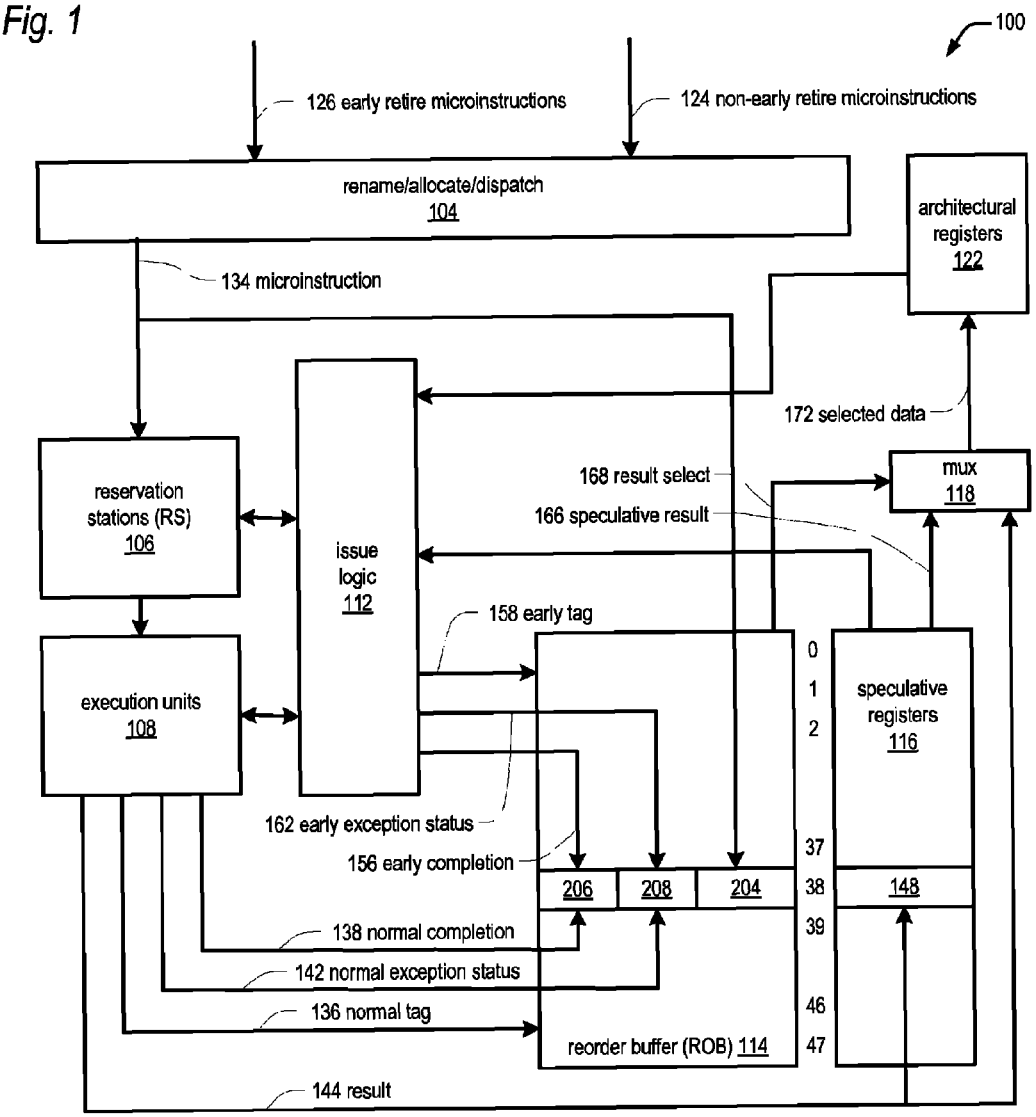
FIG. 1 is a block diagram illustrating a microprocessor according to the present invention.

Referring now to FIG. 1, a block diagram illustrating a microprocessor 100 according to the present invention is shown. The microprocessor 100 includes a rename/allocate/dispatch unit 104; reservation stations 106 coupled to the rename/allocate/dispatch unit 104; execution units 108 coupled to the reservation stations 106; issue logic 112 coupled to the reservation stations 106 and execution units 108; a reorder buffer (ROB) 114 coupled to the rename/allocate/dispatch unit 104, execution units 108, and issue logic 112; speculative registers 116 coupled to the execution units 108 and issue logic 112; a mux 118 coupled to the execution units 108, ROB 114, and speculative registers 116; and architectural registers 122 coupled to the mux 118 and issue logic 112.

In recognizing the hardware costs and additional complexity associated with growing the size of a reorder buffer (ROB), the present inventors have recognized that the portion of the microprocessor 100 that retires an instruction from the ROB 114 performs multiple actions that take multiple clock cycles. The actions include updating the instruction's status in its ROB 114 entry and then analyzing the status of the oldest instructions in the ROB 114 to see if they are ready to be retired. Normally, the ROB 114 performs these actions after the execution unit 108 outputs the execution result and signals completion of the instruction and before the ROB 114 updates the architectural state and frees the ROB 114 entry. The present inventors advantageously recognized that the ROB 114 can perform some of these retirement actions in parallel with the execution of the instruction, i.e., without having the instruction result yet, as long as the instruction does not generate an exception once the retire unit starts its process of retiring instructions.

Accordingly, the present inventors have modified the microprocessor 100 to generate an early completion signal 156 for non-excepting instructions that have fixed execution latency. The microprocessor 100 knows the fixed execution latency of the non-excepting instruction and generates the early completion signal 156 based on the number of clocks it takes the instruction to execute, such that the execution units 108 provide the result 144 just in time to update the architectural state 122 and to free the ROB 114 entry for a new instruction. In one embodiment, advantageously, a non-excepting instruction may be retired 3 clock cycles sooner than an excepting instruction that has the same execution latency and that was issued on the same clock cycle as the non-excepting instruction may be retired. In one embodiment, it is the issue logic 112, which issues instructions to the execution units 108 for execution, which generates the early completion signal 156.

Referring again to FIG. 1, the rename/allocate/dispatch unit 104 receives microinstructions including early retire microinstructions 126 and non-early retire microinstructions 124. As described in more detail below, the issue logic 112 generates the early completion signal 156 for early retire microinstructions 126 and generates a normal completion signal 138 for non-early retire microinstructions 124.

The early retire microinstructions 126 are not capable of causing an exception after being issued to the execution units 108. Many instructions are capable of producing exceptions. For example, an instruction may produce an operand-related exception such as a divide-by-zero fault, or an instruction may produce an address-related fault such as a page fault. When a microinstruction produces a fault, the microprocessor 100 must interrupt program execution in order to service the exception and correct the fault, if possible. The microprocessor 100 handles an exception by saving away state of the microprocessor 100, including the address of the instruction that caused the exception. The microprocessor 100 then flushes any instructions younger than the excepting instruction and transfers control to a microcode routine associated with the particular type of exception. For architectural exceptions, the microcode routine eventually transfers control to the operating system exception handler routine for the exception type. For some exception types, the operating system exception handler eventually executes an instruction (such as an IRET instruction in the IA-32 architecture) to return control to the excepting instruction or to another instruction sequence in the program that includes the excepting instruction. However, in some cases the operating system exception handler will not return control to the program that caused the exception, but instead will abort the program entirely. Because in response to an exception the microprocessor 100 flushes instructions younger than the excepting instruction, there is no guarantee that the newer instructions will ever be re-executed. Furthermore, if they are re-executed, they may receive different input operand values than they received during their previous execution and consequently they may generate a different result value on re-execution than on the original execution. For these reasons, the microprocessor 100 does not attempt to retire excepting instructions early. One type of exception is a replay. Replays are non-architectural micro-exceptions. That is, replays are exceptions recognized by the microarchitecture of the microprocessor but not recognized by the macroarchitecture of the microprocessor. When the microprocessor performs a replay of an instruction or set of instructions, it flushes the instructions from the instruction pipeline and re-issues them for execution. When the instructions are re-issued, their source operands are re-fetched and provided to the execution units and the processor state during the re-execution may be different than it was during the first execution.

Another characteristic of the early retire microinstructions 126, according to one embodiment, is that they require a fixed number of clock cycles to execute and the fixed execution latency of the instruction is known at the time the issue logic 112 issues the instruction. The issue logic 112 knows precisely how many clocks to wait, if any, before generating the early completion signal 156 to the reorder buffer 114. Accordingly, the issue logic 112 does not generate the early completion signal 156 for an instruction that has a variable execution time, such as, for example, an instruction whose execution time may vary depending upon its input values.

The rename/allocate/dispatch unit 104 receives microinstructions 124/126 and determines its operand dependencies. The rename/allocate/dispatch unit 104 also allocates a free entry in the ROB 114 for each microinstruction 134 and writes the microinstruction 134 into a microinstruction field 204 (of FIG. 2) of the allocated entry. Unfortunately, if the ROB 114 is full, i.e., if there are no free entries in the ROB 114, then the rename/allocate/dispatch unit 104 cannot make forward progress providing instructions to execute because it has nowhere to store the microinstructions 124/126, which may have an adverse impact of utilization of the execution units 108. Advantageously, the early retire feature of the present invention enables entries in the ROB 114 to be freed sooner than they normally would, as described herein, thereby potentially enabling higher utilization of the execution units 108.

In one embodiment, the reservation stations 106 include one reservation station for each of the execution units 108. Each reservation station 106 is a queue that temporarily stores a microinstruction in each storage location of the queue.

The execution units 108 include individual execution units that execute each of the microinstructions 124/126 in the microprocessor 100 microinstruction set. For example, a microprocessor 100 may have individual execution units that perform integer and logical operations, floating point operations, media operations, data load operations, data store operations, branch instruction resolution, and other functions.

The reorder buffer (ROB) 114 retires the microinstructions 124/126. In particular, the ROB 114 insures that although the microinstructions 124/126 may be executed out-of-order (i.e., out of program order) by the execution units 108, they retire in-order (i.e., in program order). The ROB 114 provides temporary storage for microinstructions and status information related to microinstructions. The ROB 114 includes a fixed number of entries, where each entry stores a microinstruction and status associated with that microinstruction. In one embodiment, there are 48 entries in the ROB 114. However, in other embodiments there may be fewer or more entries in the ROB 114. The ROB 114 also includes control logic that performs various functions related to instruction retirement, as described herein, particularly with respect to the (A) stage 318, (B) stage 322, and (C) stage 324 of FIGS. 3a through 5b.

Figure 2:
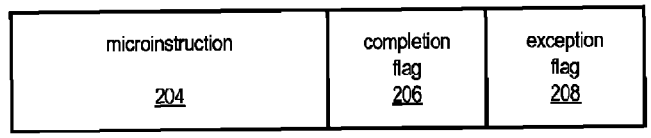
FIG. 2 is a block diagram of a microinstruction entry in the reorder buffer (ROB) of FIG. 1 according to the present invention.

Turning briefly to FIG. 2, a block diagram of a microinstruction entry in ROB 114 of FIG. 1 according to the present invention is shown. Each microinstruction entry includes a microinstruction field 204, completion flag 206, and exception flag 208. The rename/allocate/dispatch unit 104 allocates an entry in the ROB 114 for each microinstruction 124/126 and then writes the microinstruction 124/126 into the microinstruction field 204. When the completion flag 206 is true, it effectively indicates that the microinstruction 204 has finished execution and is ready to be retired from the ROB 114 and that it is safe to update the result of the microinstruction 204 into the architectural state of microprocessor 100. This is strictly true for non-early retire microinstructions 124 and is effectively true for early retire microinstructions 126, as will be discussed in more detail below. When the exception flag 208 is true it indicates that the microinstruction has generated an exception.

Referring again to FIG. 1, corresponding to each ROB 114 entry is a speculative register 148 in speculative registers 116 that provides temporary storage for the result of the corresponding executed microinstruction. For entry 38 shown in FIG. 1, speculative register 148 in speculative registers 116 is used to store the result.

If there is an available entry in ROB 114, rename/allocate/dispatch unit 104 writes the microinstruction 134 into the microinstruction field 204 of the available ROB 114 entry. If there is not an available entry in ROB 114, rename/allocate/dispatch unit 104 waits until a ROB 114 entry becomes available. In FIG. 1, the available ROB entry is shown as entry 38 of 48 total entries. However, in practice the entry could be any entry within ROB 114. In parallel with writing the microinstruction 134 into ROB 114, rename/allocate/dispatch unit 104 transfers microinstructions 134 to the reservation station in reservation stations 106 corresponding to the execution unit within execution units 108 that will execute the microinstruction 134. The microinstructions 134 may be either early retire 126 or non-early retire 124 type microinstructions.

Issue logic 112 is coupled to reservation stations 106, execution units 108, and ROB 114 and transfers microinstructions from reservation stations 106 to execution units 108 when the microinstruction has all source operands available and the execution unit for the microinstruction is available. Issue logic 112 also identifies early-retire microinstructions and communicates with the ROB 114 to accomplish their early retirement, as discussed with respect to the remaining Figures.

Microprocessor 100 includes architectural registers 122 that provide storage for constants, addresses, and other data used as operands by the microinstructions 134. Intermediate results from execution units 108 are written to speculative registers 116. Issue logic 112 obtains microinstruction operands from the architectural registers 122, the speculative registers 116, and data forwarded from the execution units 108.

For non-early retire microinstructions 124, the execution units 108 generate a normal tag 136 to ROB 114 that indicates which ROB 114 entry will be updated by execution units 108. Execution units 108 also generate a normal completion signal 138 and normal exception status 142 upon execution completion of a non-early retire microinstruction 124. In the clock cycle following the clock cycle in which the execution units 108 generate the normal completion 138 and normal exception status 142, the ROB 114 sets the completion flag 206 and writes exception flag 208 if an exception condition is associated with a non-early retire microinstruction 124.

For early retire microinstructions 126, the execution units 108 generate an early tag 158 to ROB 114 that indicates which ROB 114 entry will be updated by issue logic 112. Issue logic 112 also generates an early completion signal 156 and early exception status 162 upon execution completion of an early retire microinstruction 126. In the clock cycle following the clock cycle when the issue logic 112 generates the early completion 156 and early exception status 162, the ROB 114 sets the completion flag 206, and clears the exception flag 208, since an early retire microinstruction 126 cannot cause an exception condition.

Result 144 is generated by execution units 108 for both non-early retire 124 and early retire 126 microinstructions. Result 144 is written to the speculative registers 116, and provided to mux 118. Mux 118 selects between result 144 and speculative result 166, based on result select 168. The output of mux 118 is selected data 172, and is provided to architectural registers 122 to update the architectural state of microprocessor 100. The operation of mux 118 and the processing of non-early retire 124 and early retire 126 microinstructions will be described in detail with respect to the remaining Figures.

Referring now to FIG. 3a, a block diagram illustrating issue and execute stages and retirement stages for non-early retire microinstructions 124 according to the present invention is shown. The normal flow of non-early retire microinstructions 124 proceeds through six issue and execute stages and three retirement stages. Prior to clock 0, rename/allocate/dispatch unit 104 transfers various microinstructions 134 to a reservation station of reservation stations 106, where issue logic 112 identifies microinstructions as non-early retire microinstructions 124.

The first stage is dispatch stage (D) 304, in clock cycle 0. Issue logic 112 selects the oldest ready microinstruction from each reservation station 106 and dispatches the microinstruction.

The second stage is queue stage (Q) 306, in clock cycle 1. Issue logic 112 obtains instruction data for non-early retire microinstruction 124. Instruction data includes a tag of the microinstruction 124 that identifies its entry within the ROB 114, as well as constants and identifiers for the operands associated with non-early retire microinstruction 124.

The third stage is register file stage (R) 308, in clock cycle 2. Issue logic 112 obtains the microinstruction 124 source operands using the tag obtained in the Q stage 306. The operands may be obtained from the architectural registers 122, speculative registers 116, or forwarded from the same or a different execution unit of execution units 108.

The fourth stage is issue stage (I) 312, in clock cycle 3. In issue stage 312, issue logic 112 transfers non-early retire microinstructions 124 and the fetched operands and data to execution units 108.

The fifth stage is execute stage (E) 314, in clock cycle 4. In execute stage 314, execution units 108 execute non-early retire microinstructions 124 to generate the results of the non-early retire microinstructions 124. Although for simplicity of understanding, the execute stage 314 is shown as only a single clock in duration, in practice it may be multiple clocks. The fastest microinstructions take only a single clock to execute, but other microinstructions execute in multiple clocks. Some highly complex arithmetic microinstructions may even take many tens of clocks to execute. Therefore, for execute stages 314 longer than one clock, succeeding stages will be delayed by a number of clocks depending on execution time.

The sixth stage is writeback stage (W) 316, in clock cycle 5. In writeback stage 316, execution units 108 write results from execution of non-early retire microinstructions 124 to speculative registers 116. Execution units 108 also generate normal tag 136, normal completion 138, and normal exception status 142 to ROB 114. Normal tag 136 identifies the entry in ROB 114 that normal completion 138 and normal exception status 142 will be written to.

The seventh stage is update ROB stage (A) 318, in clock cycle 6. ROB 114 writes normal completion 138 and normal exception status 142 generated by execution units 108 in writeback stage (W) 316 to the ROB 114 entry corresponding to normal tag 136. ROB 114 sets completion flag 206 in ROB 114 in response to receiving normal completion 138 in clock cycle 5, to indicate that the microinstruction in ROB 114 entry 38 is ready to be retired. Normal exception status 142 is stored in exception flag 208 of ROB 114 to indicate whether the non-early retire microinstruction 124 generated an exception condition.

The eighth stage is find oldest entry stage (B) 322, in clock cycle 7. In the find oldest entry stage (B) 322, ROB 114 snoops the oldest microinstructions in ROB 114 to determine how many, if any, microinstructions may be retired in the following clock cycle. The maximum number of microinstructions that may be simultaneously retired is dependent on the design of microprocessor 100, but in one embodiment the maximum number of microinstructions that may be simultaneously retired is three. Microinstructions may be retired only if completion flag 206 is set and exception flag 208 is cleared. All microinstructions must be retired in-order. Therefore, if the oldest microinstruction is not ready to be retired, no other microinstructions may be retired ahead of it.

The ninth stage is retire stage (C) 324, in clock cycle 8. In retire stage (C) 324, ROB 114 invalidates ROB 114 entries of all microinstructions being retired, and writes the results of the retiring microinstructions from their respective speculative registers 116 to the appropriate architectural registers 122. ROB 114 generates result select 168 to mux 118 in order for mux 118 to select speculative result 166. Mux 118 then outputs selected data 172 to architectural registers 122. At this point, the microinstruction has been retired, and the result of execution has been written to architectural registers 122. Although retirement stages A 318, B 322, and C 324 are described as pipeline stages, in one embodiment they are actions that a state machine within ROB 114 control logic performs during sequential clock cycles.

Referring now to FIG. 3b, a block diagram illustrating issue and execute stages and retirement stages for early retire microinstructions 126 according to the present invention is shown. The early flow of early retire microinstructions 126 proceeds through the same six issue and execute stages and the same three retirement stages as non-early retire microinstructions 124 of FIG. 3a. However, the characteristics of early retire microinstructions 126 allow certain issue and execute stages to be overlapped with certain retirement stages such that they are performed in parallel. The stages perform the same operations on an early retire microinstructions 126 in a given stage of FIG. 3b as they perform on a non-early retire microinstructions 124 as described above with respect to FIG. 3a, except for the following differences.

The first difference is that in FIG. 3b the retirement stages A 318, B 322, and C 324 perform their operations during clock cycles 3, 4, and 5, respectively, rather than in stages 6, 7, and 8 as in FIG. 3a. FIG. 3b illustrates a situation in which the early retire microinstruction 126 is a single clock cycle execution instruction, i.e., the early retire microinstruction 126 requires only a single clock cycle in the E stage 314 to execute. However, for early retire microinstructions 126 that require multiple clock cycles in the E stage 314 to execute, the clock cycles in which the retirement stages A 318, B 322, and C 324 perform their operations is shifted out in time by the number of additional clock cycles. So, for example, in the case of an early retire microinstruction 126 that requires 3 clock cycles to execute, the retirement stages A 318, B 322, and C 324 perform their operations during clock cycles 5, 6, and 7, respectively, whereas in the case of a non-early retire microinstruction 124 that requires 3 clocks to execute, the retirement stages A 318, B 322, and C 324 would perform their operations during clock cycles 8, 9, and 10, respectively. Thus, regardless of the number of clock cycles required by an instruction to execute, the early retire feature described herein enables early retire microinstructions 126 to potentially retire earlier than a non-early retire microinstruction 124 that requires the same number of clock to execute, which according to one embodiment is three clock cycles earlier.

The second difference in the case of most early retire microinstructions 126, namely early retire microinstructions 126 that require only a single clock cycle in the E stage 314, is that the R stage 308 additionally generates the early completion 156, early tag 158, and early exception status 162 signals. The R stage 308 is the earliest stage in which issue logic 112 can generate early completion 156, depending on the number of clocks the early retire microinstruction 126 takes to execute. The issue logic 112 keeps track of the number of clocks required to execute each type of early retire microinstruction 126, and if the early retire microinstruction 126 takes more than one clock to execute, the issue logic 112 will delay the stage in which the early retire microinstruction 126 is located when it generates the early completion 156, early tag 158, and early exception status 162 by the number of additional clocks required to execute the early retire microinstruction 126. Therefore, for example, for an early retire microinstruction 126 that takes three clocks to execute, the issue logic 112 will generate the early completion 156, early tag 158, and early exception status 162 in the first clock of execute stage (E) 314, rather than in the R stage 308 as it would for a single clock execution early retire microinstruction 126.

The third difference is that in writeback stage (W) 316, the execution units 108 do not generate the normal tag 136, normal completion 138, and normal exception status 142 to ROB 114 for the early retire microinstruction 126, since the issue logic 112 previously generated the early completion 156, early tag 158, and early exception status 162 for the early retire microinstruction 126, as described above, beginning in the R stage 308 (in the case of a single clock cycle execution instruction) or a subsequent stage (in the case of a multiple clock cycle execution instruction).

The fourth difference is that the A stage 318 updates the completion flag 206 and exception flag 208 based on the early completion 156, early tag 158, and early exception status 162 for the early retire microinstruction 126, rather than upon the normal tag 136, normal completion 138, and normal exception status 142 signals as it would in the case of a non-early retire microinstruction 124.

The fifth difference is that the C stage 324 writes the architectural registers 122 with the result 144 directly from the execution units 108 via mux 118, rather than from the speculative registers 116 as it does for a non-early retire microinstruction 124.

Referring now to FIG. 4a, a table illustrating a sequence of three non-early retire microinstructions 124 according to the present invention is shown. The three non-early retire microinstructions 124 are denoted m1, m2, and m3. The number of clock cycles required to execute each of the instructions, i.e., the number of clocks in which the instruction resides in the E stage 314 of FIGS. 3a and 3b, is also shown, namely: m1 requires only 1 execution cycle, m2 requires 3 execution cycles, and m3 requires 2 execution cycles.

Referring now to FIG. 4b, a timing diagram illustrating progression of the sequence of non-early retire microinstructions 124 of FIG. 4a through the stages of FIG. 3a according to the present invention is shown. FIG. 4b illustrates clock cycles 1-11. In the example shown in FIG. 4b, the execution units 108 of FIG. 1 include two individual execution units denoted EU #1 314 and EU #2 314. Microinstructions m1 and m3 of FIG. 4a are of a type of non-early retire microinstruction 124 that are executed by execution unit EU #1 314, and microinstruction m2 of FIG. 4a is of a type of non-early retire microinstruction 124 that is executed by execution unit EU #2 314. Although many more microinstructions than three microinstructions in FIG. 4a may be active within various stages of microprocessor 100 during clock cycles 1-11, only microinstructions m1-m3 are shown.

In clock cycle 1, (D) stage 304 selects m1 for dispatch to EU #1 314 and selects m2 for dispatch to EU #2 314, since one microinstruction can be dispatched per individual execution unit per clock cycle.

In clock cycle 2, m1 and m2 proceed to (Q) stage 306, where issue logic 112 obtains instruction data for both microinstructions. Additionally, the (D) stage 304 selects m3 for dispatch to EU #1 314.

In clock cycle 3, m1 and m2 proceed to (R) stage 308, where issue logic 112 obtains the microinstruction 124 source operands. Additionally, m3 proceeds to (Q) stage 306.

In clock cycle 4, m1 and m2 proceed to (I) stage 312, where issue logic 112 transfers m1 and m2 along with their fetched instruction data and operands to their respective execution units 108. Additionally, m3 proceeds to (R) stage 308.

In clock cycle 5, m1 begins execution in EU #1 314 and m2 begins execution in EU #2 314. Additionally, m3 proceeds to (I) stage 312. As shown in FIG. 4a, m1 requires only a single clock cycle to execute, m2 requires three clock cycles to execute, and m3 requires two clock cycles to execute.

In clock cycle 6, m1 has completed execution and enters writeback (W) stage 316. In (W) stage 316, EU #1 314 generates normal tag 136, normal completion 138, and normal exception status 142 for m1 to ROB 114, as indicated in FIG. 4b. EU #1 314 also generates result 144. Additionally, m2 continues the second clock of three clock execution in EU #2 314, and m3 begins execution in now-available EU #1 314.

In clock cycle 7, m1 enters stage (A) 318, where ROB 114 updates the completion flag 206 and exception status 208 in the ROB 114 entry allocated to m1, which is specified by normal tag 136. Additionally, m2 enters the third clock of three clock execution in EU #2 314, and m3 enters the second clock of two clock execution in EU #1 314.

In clock cycle 8, in ROB stage (B) 322, ROB 114 examines its oldest microinstructions, which includes m1, to determine whether they are ready to be retired. Additionally, both m2 and m3 enter write back stage (W) 316 and EU #1 and EU #2 314 generate their respective normal tag 136, normal completion 138, and normal exception status 142 to ROB 114 for each microinstruction m2 and m3, as indicated in FIG. 4b. EU #1 and EU #2 314 also generate their respective result 144 for each of microinstructions m2 and m3.

In clock cycle 9, m1 is retired by ROB 114 in stage (C) 324. That is, control logic within the ROB 114 generates a value on result select 168 to cause the mux 118 to write the result for m1 from its respective speculative register 116 to the architectural registers 122, and the ROB 114 entry previously allocated to m1 is freed allowing a new microinstruction to be allocated by rename/allocate/dispatch unit 104 to ROB 114. Both m2 and m3 enter ROB stage (A) 318, where ROB 114 updates the respective flags 206/208 for both m2 and m3 as described earlier.

In clock cycle 10, in ROB stage (B) 322, ROB 114 examines its oldest microinstructions to determine m2 and m3 are ready to be retired.

In clock cycle 11, m2 and m3 are retired by ROB 114 in stage (C) 324, allowing two new microinstructions to be allocated by rename/allocate/dispatch unit 104 to ROB 114.

Referring now to FIG. 5a, a table illustrating a sequence of nine early retire microinstructions 126 according to the present invention is shown. The nine early retire microinstructions 126 are denoted m1 through m9. The number of clock cycles required to execute each of the instructions is also shown, namely: m1 and m4-m9 require only 1 execution cycle, m2 requires 3 execution cycles, and m3 requires 2 execution cycles.

Referring now to FIG. 5b, a timing diagram illustrating progression of the sequence of early retire microinstructions 126 of FIG. 5a through the stages of FIG. 3b according to the present invention is shown. FIG. 5b, like FIG. 5a, illustrates clock cycles 1-11. Microinstructions m1, m3, m5, m7, and m9 of FIG. 5a are of a type of early retire microinstructions 126 that are executed by execution unit EU #1 314, and microinstructions m2, m4, m6, and m8 of FIG. 5a are of a type of early retire microinstruction 126 that are executed by execution unit EU #2 314.

In clock cycle 1, (D) stage 304 selects m1 for dispatch to EU #1 314 and selects m2 for dispatch to EU #2 314, since one microinstruction can be dispatched per individual execution unit per clock cycle.

In clock cycle 2, m1 and m2 proceed to (Q) stage 306. Additionally, the (D) stage 304 selects m3 for dispatch to EU #1 314.

In clock cycle 3, m1 and m2 proceed to (R) stage 308. Advantageously, the issue logic 112 generates early completion 156, early tag 158, and early exception status 162 to ROB 114 for m1, as shown in FIG. 5b, which is 3 clock cycles earlier than the execution unit 108 generated the normal tag 136, normal completion 138, and normal exception status 142 for non-early retire microinstruction 124 m1 in FIG. 4b. Additionally, m3 proceeds to (Q) stage 306. Although m2 is also in the (R) stage 308, the issue logic 112 must wait two more clock cycles before generating early tag 158, early completion 156, and early exception status 162 to ROB 114 for m2, since m2 requires three clock cycles to execute.

In clock cycle 4, m1 and m2 proceed to (I) stage 312. Additionally, m3 proceeds to (R) stage 308. Although m3 is in the (R) stage 308, the issue logic 112 must wait one more clock cycle before generating early tag 158, early completion 156, and early exception status 162 to ROB 114 for m3, since m3 requires two clock cycles to execute. New microinstructions m4 and m5 enter dispatch (D) stage 304.

In clock cycle 5, m1 begins execution in execution unit EU #1 314 and m2 begins execution in execution unit EU #2 314. Additionally, m3 proceeds to (I) stage 312. Issue logic 112 generates early tag 158, early completion 156, and early exception status 162 to ROB 114 for m2 and m3. The one clock delay for m3 and two clock delay for m2 were noted previously in clock cycles 4 and 3, respectively. Additionally, m1 proceeds to stage (B) 322, m4 and m5 proceed to (Q) stage 306, and new microinstructions m6 and m7 enter (D) stage 304.

In clock cycle 6, m1 has completed execution and enters (W) stage 316. In (W) stage 316, EU #1 314 generates result 144 for m1 to speculative registers 116. At the same time, m1 also is retired by ROB 114 in stage (C) 324. That is, control logic in the ROB 114 generates a value on result select 168 to cause mux 118 to write the result 144 of m1 from the execution unit 108 directly to the architectural registers 122. Additionally, m2 continues the second clock of its three clock execution in EU #2 314, and m3 begins execution in now-available EU #1 314. Because issue logic 112 generated early tag 158, early completion 156, and early exception status 162 to ROB 114 for m2 and m3 in clock cycle 5, both m2 and m3 enter stage (A) 318. Additionally, m4 and m5 proceed to (R) stage 308. Issue logic 112 generates early tag 158, early completion 156, and early exception status 162 to ROB 114 for m4 and m5, as indicated in FIG. 5b. Additionally, m6 and m7 proceed to (Q) stage 306 and new microinstructions m8 and m9 enter (D) stage 304.

In clock cycle 7, m2 enters the third clock of its three clock execution in EU #2 314, and m3 enters the second clock of its two clock execution in EU #1 314. M2 and m3 also enter ROB stage (B) 322. Additionally, m4 and m5 enter (I) stage 312 and concurrently, stage (A) 318. Additionally, m6 and m7 enter stage (R) 308. Issue logic 112 generates early tag 158, early completion 156, and early exception status 162 to ROB 114 for m6 and m7. Additionally, m8 and m9 proceed to stage (Q) 306.

In clock cycle 8, m2 and m3 enter stage (W) 316 and EU #2 and EU #1 314 generate their respective results 144 for microinstructions m2 and m3. Additionally, m2 and m3 are retired by ROB 114 and the results 144 from their respective execution units 108 are written to the architectural registers 122. Additionally, m4 and m5 are executed by EU #2 and EU #1, respectively, and concurrently enter stage (B) 322. Additionally, m6 and m7 enter stage (I) 312 and stage (A) 318. Additionally, m8 and m9 enter stage (R) 308, and issue logic 112 generates early tag 158, early completion 156, and early exception status 162 to ROB 114 for m8 and m9.

In clock cycle 9, m4 and m5 enter writeback stage W 316, and EU #2 and EU #1 314 generate their respective results 144 for microinstructions m4 and m5, respectively. Additionally, m4 and m5 are retired by ROB 114 and the results 144 from their respective execution units 108 are written to the architectural registers 122. Additionally, m6 and m7 are executed by EU #2 314 and EU #1, respectively, and m6 and m7 enter stage (B) 322. Additionally, m8 and m9 enter stage (I) 312 and stage (A) 318.

In clock cycle 10, m6 and m7 enter stage (W) 316, and EU #2 and EU #1 314 generate their respective results 144 for microinstructions m6 and m7, respectively. Additionally, m6 and m7 are retired by ROB 114 and the results 144 from their respective execution units 108 are written to architectural registers 122. Additionally, m8 and m9 are executed by EU #2 and EU #1, respectively, and m8 and m9 enter stage (B) 322.

In clock cycle 11, m8 and m9 enter writeback stage (W) 316, and EU #2 and EU #1 generate their respective results 144 for microinstructions m8 and m9. Additionally, m8 and m9 enter stage (C) 324, where m8 and m9 are retired by ROB 114 and the results 144 from their respective execution units 108 are written to architectural registers 122.

Comparing FIG. 4b to 5b, it can be seen that there is a substantial benefit to retiring microinstructions early. During the six clock cycles between clock cycles 6 and 11 inclusive, the microprocessor 100 was able to retire nine early retire microinstructions 126 as shown in FIG. 5b, in contrast to only three non-early retire microinstructions 124 as shown in FIG. 4b. The increased number of microinstructions retired from the ROB 114 allows more microinstructions to be allocated into the ROB 114, which allows more microinstructions to be looked at to be scheduled to be issued for execution, and consequently potentially maximizes utilization of execution units 108.

Figure 6:
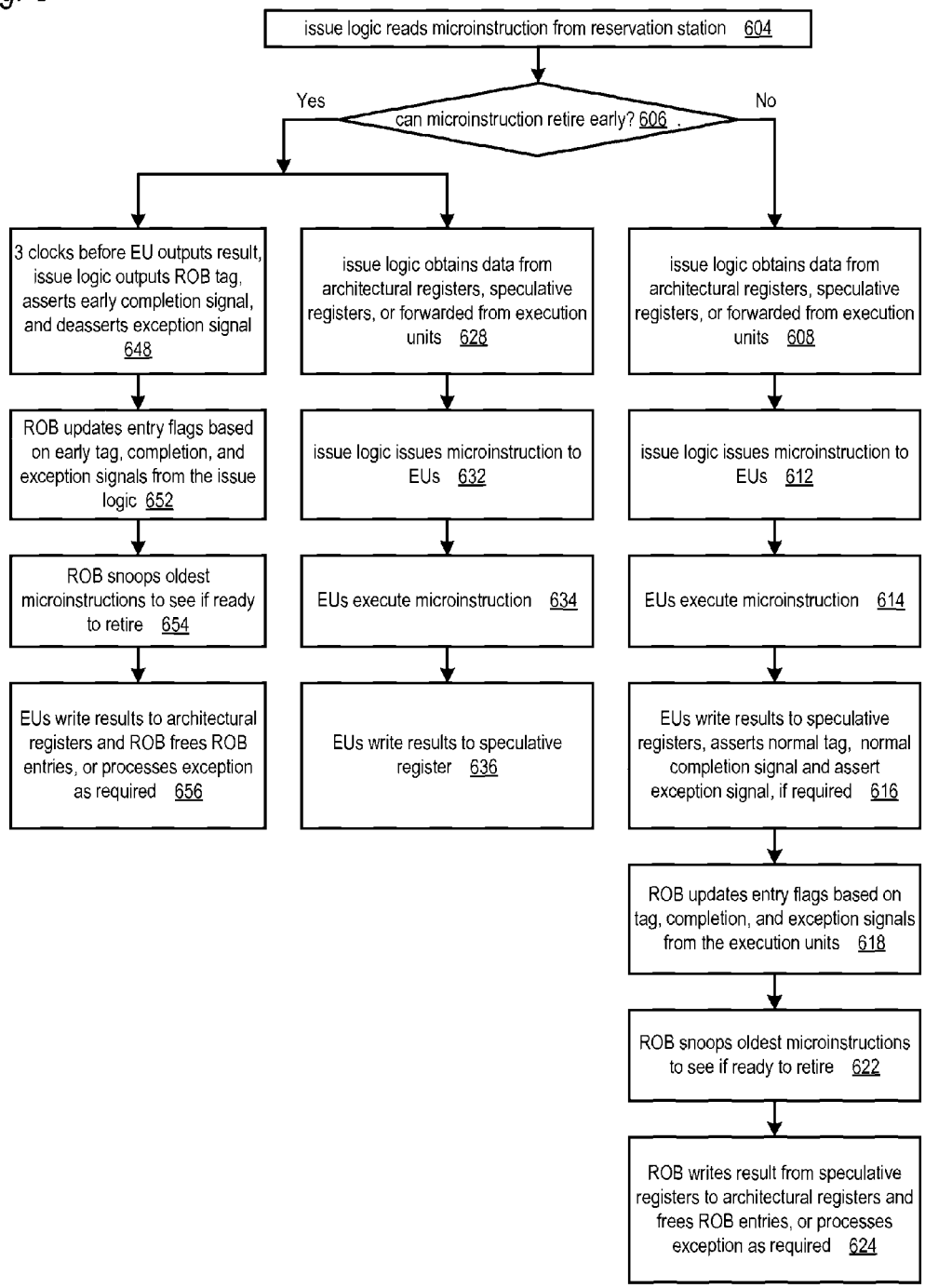
FIG. 6 is a flowchart illustrating operation of the microprocessor of FIG. 1 according to the present invention.

Referring now to FIG. 6, a flowchart illustrating operation of the microprocessor 100 of FIG. 1 according to the present invention is shown. Flow begins at block 604.

At block 604, issue logic 112 reads a microinstruction from the reservation station 106, in order to determine whether the microinstruction is an early retire microinstruction 126 or a non-early retire microinstruction 124. Flow proceeds to decision block 606.

At decision block 606, issue logic 112 determines if the microinstruction is an early retire microinstruction 126. If the microinstruction is a non-early retire microinstruction 124, then flow proceeds to block 608. If the instruction is an early retire microinstruction 126, then flow proceeds to blocks 628 and 648.

At block 608, issue logic 112 determined the microinstruction is a non-early retire microinstruction 124, and obtains operand data for the microinstruction 124 from the architectural registers 122, speculative registers 116, or data forwarded from execution units 108. Flow proceeds to block 612.

At block 612, issue logic 112 issues microinstruction 124 to an execution unit in execution units 108. Flow proceeds to block 614.

At block 614, the assigned execution unit in execution units 108 executes microinstruction 124. The number of clock cycles to execute the microinstruction 124 varies by microinstruction type. While many microinstructions execute in 1-3 clock cycles, certain complex arithmetic instructions can require many more clock cycles to execute. Flow proceeds to block 616.

At block 616, microinstruction 124 has completed execution. Execution unit 108 writes results 144 to speculative registers 116 and asserts normal tag 136, normal completion 138, and normal exception status 142 to ROB 114. Flow proceeds to block 618.

At block 618, ROB 114 updates the completion flag 206 and exception flag 208 in the entry specified by the normal tag 136 based on the values of the normal completion 138 and normal exception status 142, respectively, generated at block 616. Flow proceeds to block 622.

At block 622, ROB 114 examines the oldest microinstructions in the ROB 114 to see if any microinstructions are ready to be retired. ROB 114 checks the completion flag 206 and the exception flag 208 for the oldest microinstructions. In a preferred embodiment, the oldest three microinstructions are analyzed. If the completion flag 206 is set and the exception status 208 is cleared, the microinstruction is ready to be retired. A newer microinstruction in ROB 114 can be retired only if all older microinstructions are retiring in the same clock cycle. If the oldest microinstruction in ROB 114 is not ready to be retired, ROB 114 must wait to retire the microinstruction until the microinstruction is ready to be retired as indicated by completion flag 206. Flow proceeds to block 624.

At block 624, ROB 114 writes speculative result 166 from speculative registers 116 to architectural registers 122 by generating result select 168 to mux 118 to transfer speculative result 166 to selected data 172. ROB 114 also invalidates the ROB 114 entries for the microinstructions being retired, so the invalidated ROB 114 entries can be allocated to new microinstructions by rename/allocate/dispatch unit 104. However, if the exception flag 208 indicates that the non-early retire microinstruction 124 has generated an exception, then the microprocessor 100 processes the exception instead. Flow ends at block 624.

At block 628, issue logic 112 has determined the microinstruction is an early retire microinstruction 126, and obtains operand data for the microinstruction 126 from the architectural registers 122, the speculative registers 116, or data forwarded from the execution units 108. Flow proceeds to block 632.

At block 632, issue logic 112 issues microinstruction 126 to an execution unit 108. Flow proceeds to block 634.

At block 634, the execution unit 108 executes microinstruction 126. Flow proceeds to block 636.

At block 636, microinstruction 126 has completed execution. The execution unit 108 writes the result 144 to speculative registers 116. Flow ends at block 636.

Blocks 648, 652, 654, and 656 occur in parallel with blocks 628, 632, 634, and 636. Timing dependencies between blocks is dependent upon the number of execution clock cycles for an early retire microinstruction 126, as described with reference to block 648.

At block 648, issue logic 112 outputs early tag 158, early completion 156, and clears early exception status 162 three clock cycles before execution unit 108 outputs the result 144 of the early retire microinstruction 126. Early exception status 162 is cleared since early retire microinstructions 126 does not cause exceptions. Issue logic 112 keeps track of how many clock cycles each microinstruction 126 takes to execute, and maintains a current count of how many clock cycles a given microinstruction 126 is through execution. The three clock cycle delay ensures the microinstruction 126 will be ready to retire the clock cycle after microinstruction 126 completes execution. Other embodiments may have fewer or more issue and execute stages and/or retirement stages than is shown in FIGS. 3a and 3b. Therefore, for other embodiments, the issue logic 112 may generate the early completion 156, early exception status 158, and early tag 162 values more or less than three clock cycles before the execution unit 108 outputs the result of an early retire microinstruction 126. Flow proceeds to block 652.

At block 652, ROB 114 updates completion flag 206 and exception flag 208 based on early tag 158, early completion 156, and early exception status 162 from issue logic 112. Flow proceeds to block 654.

At block 654, ROB 114 examines the oldest microinstructions in the ROB to see if any microinstructions are ready to be retired, similar to block 622. Exception status 208 is always cleared for early retire microinstructions 126, since early retire microinstructions 126 cannot generate exceptions. Flow proceeds to block 656.

At block 656, ROB 114 writes result 144 from execution unit 108 to architectural registers 122 by generating result select 168 to transfer result 144 from execution units 108 to selected data 172. ROB 114 also invalidates ROB 114 entries for the microinstructions being retired, so the invalidated ROB 114 entries can be allocated to new microinstructions by rename/allocate/dispatch unit 104. Flow ends at block 656.

As may be observed, it is advantageous to increase microinstruction retire rate in order to increase performance in an out-of order execution microprocessor. By early retiring microinstructions as described herein, reorder buffer entries can be freed up sooner than normal retiring microinstructions, allowing microinstructions to be allocated to available reorder buffer entries sooner. This increases lookahead capability and execution unit utilization by increasing the number of microinstructions in reservation stations and increasing the likelihood that a microinstruction in a reservation station will be ready to execute when the execution unit is available to start executing another microinstruction.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. The present invention is implemented within a microprocessor device which may be used in a general purpose computer.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor embodied in hardware for improving out-of-order superscalar execution unit utilization with a relatively small in-order instruction retirement buffer by selectively initiating instruction retirement early, the microprocessor comprising:
   a plurality of execution units, each configured to calculate the result of an instruction, wherein the instruction is either an excepting type instruction or a non-excepting type instruction, wherein the excepting type instruction is capable of causing the microprocessor to take an exception after being issued to the execution unit to calculate its result, wherein the non-excepting type instruction is incapable of causing the microprocessor to take an exception after being issued to the execution unit to calculate its result; and
   a retire unit, coupled to the plurality of execution units, configured to make a determination that an instruction is the oldest instruction in the microprocessor and that the instruction is ready to update the architectural state of the microprocessor with its result, wherein the retire unit is configured to make the determination before the execution unit outputs the result of the non-excepting type instruction, wherein the retire unit is configured to make the determination after the execution unit outputs the result of the excepting type instruction.

2. The microprocessor of claim 1, wherein the non-excepting type instruction has a fixed execution latency.

3. The microprocessor of claim 1, wherein the number of clock cycles required to execute the non-excepting type instruction is known at the time the instruction is ready to be issued to the execution unit.

4. The microprocessor of claim 1, wherein the retire unit comprises:
   an in-order instruction retirement buffer, coupled to the plurality of execution units, having a plurality of entries each configured to store an indicator associated with an instruction, the indicator configured to indicate whether the instruction is ready to update the architectural state of the microprocessor with its result;
   wherein the retire unit is further configured to update an entry of the plurality of entries before the execution unit outputs the result of the non-excepting type instruction;
   wherein the retire unit is further configured to update an entry of the plurality of entries after the execution unit outputs the result of the excepting type instruction.

5. The microprocessor of claim 4, further comprising:
   control logic, coupled to said in-order instruction retirement buffer, configured to update the indicator to indicate the instruction is ready to update the architectural state of the microprocessor with its result a plurality of clock cycles prior to a clock cycle in which the execution unit outputs the result of the non-excepting type instruction.

6. The microprocessor of claim 4, wherein the retire unit is further configured to free for reuse an entry of the plurality of entries of the in-order instruction retirement buffer for the non-excepting type instruction sooner than for the excepting type instruction.

7. The microprocessor of claim 4, wherein the retire unit is further configured to free for reuse an entry of the plurality of entries of the in-order instruction retirement buffer when the microprocessor updates its architectural state with the result of the instruction stored in the entry.

8. A method for improving out-of-order superscalar execution unit utilization in a microprocessor embodied in hardware with a relatively small in-order instruction retirement buffer by selectively initiating instruction retirement early, the method comprising:
   calculating the result of an instruction, wherein the instruction is either an excepting type instruction or a non-excepting type instruction, wherein the excepting type instruction is capable of causing the microprocessor to take an exception after being issued to an execution unit to calculate its result, wherein the non-excepting type instruction is incapable of causing the microprocessor to take an exception after being issued to the execution unit to calculate its result; and
   making a determination that an instruction is the oldest instruction in the microprocessor and that the instruction is ready to update the architectural state of the microprocessor with its result;
   wherein said making the determination comprises making the determination before the execution unit outputs the result of the non-excepting type instruction;
   wherein said making the determination comprises making the determination after the execution unit outputs the result of the excepting type instruction.

9. The method of claim 8, wherein the non-excepting type instruction has a fixed execution latency.

10. The method of claim 8, wherein the number of clock cycles required to execute the non-excepting type instruction is known at the time the instruction is ready to be issued to the execution unit.

11. The method of claim 8, wherein the microprocessor includes an in-order instruction retirement buffer having a plurality of entries each configured to store an indicator associated with an instruction, the indicator configured to indicate whether the instruction is ready to update the architectural state of the microprocessor with its result, the method further comprising:

updating an entry of the plurality of entries before the execution unit outputs the result of the non-excepting type instruction; and updating an entry of the plurality of entries after the execution unit outputs the result of the excepting type instruction.

12. The method of claim 11, further comprising:

updating the indicator to indicate the instruction is ready to update the architectural state of the microprocessor with its result a plurality of clock cycles prior to a clock cycle in which the execution unit outputs the result of the non-excepting type instruction.

13. The method of claim 11, further comprising:

freeing for reuse an entry of the plurality of entries of the in-order instruction retirement buffer for the non-excepting type instruction sooner than for the excepting type instruction.

14. The method of claim 11, further comprising:

freeing for reuse an entry of the plurality of entries of the in-order instruction retirement buffer when the microprocessor updates its architectural state with the result of the instruction stored in the entry.

15. A computer program product for use computing device, the computer program product comprising:

a non-transitory computer usable storage medium, having computer readable program code embodied in said medium, for specifying a microprocessor for improving out-of-order superscalar execution unit utilization with a relatively small in-order instruction retirement buffer by selectively initiating instruction retirement early, the computer readable program code comprising:

first program code for specifying a plurality of execution units, each configured to calculate the result of an instruction, wherein the instruction is either an excepting type instruction or a non-excepting type instruction, wherein the excepting type instruction is capable of causing the microprocessor to take an exception after being issued to the execution unit to calculate its result, wherein the non-excepting type instruction is incapable of causing the microprocessor to take an exception after being issued to the execution unit to calculate its result; and second program code for specifying a retire unit, coupled to the plurality of execution units, configured to make a determination that an instruction is the oldest instruction in the microprocessor and that the instruction is ready to update the architectural state of the microprocessor with its result, wherein the retire unit is configured to make the determination before the execution unit outputs the result of the non-excepting type instruction, wherein the retire unit is configured to make the determination after the execution unit outputs the result of the excepting type instruction.

16. The computer program product for use with a computing device of claim 15, wherein the non-excepting type instruction has a fixed execution latency.

17. The computer program product for use with a computing device of claim 15, wherein the number of clock cycles required to execute the non-excepting type instruction is known at the time the instruction is ready to be issued to the execution unit.

18. The computer program product for use with a computing device of claim 15, wherein the retire unit comprises:

an in-order instruction retirement buffer, coupled to the plurality of execution units, having a plurality of entries each configured to store an indicator associated with an instruction, the indicator configured to indicate whether the instruction is ready to update the architectural state of the microprocessor with its result;

wherein the retire unit is further configured to update an entry of the plurality of entries before the execution unit outputs the result of the non-excepting type instruction;

wherein the retire unit is further configured to update an entry of the plurality of entries after the execution unit outputs the result of the excepting type instruction.

19. The computer program product for use with a computing device of claim 18, further comprising:

control logic, coupled to said in-order instruction retirement buffer, configured to update the indicator to indicate the instruction is ready to update the architectural state of the microprocessor with its result a plurality of clock cycles prior to a clock cycle in which the execution unit outputs the result of the non-excepting type instruction.

20. The computer program product for use with a computing device of claim 18, wherein the retire unit is further configured to free for reuse an entry of the plurality of entries of the in-order instruction retirement buffer for the non-excepting type instruction sooner than for the excepting type instruction.

21. The computer program product for use with a computing device of claim 18, wherein the retire unit is further configured to free for reuse an entry of the plurality of entries of the in-order instruction retirement buffer when the microprocessor updates its architectural state with the result of the instruction stored in the entry.

* * * * *